United States Patent [19]

Kogane

[11] 4,444,485
[45] Apr. 24, 1984

[54] PHOTOGRAPHIC PRINTING APPARATUS

[75] Inventor: Mikio Kogane, Kanagawa, Japan

[73] Assignee: Fuji Photo Film, Co., Ltd., Kanagawa, Japan

[21] Appl. No.: 363,751

[22] Filed: Mar. 30, 1982

[30] Foreign Application Priority Data

Apr. 1, 1981 [JP] Japan .............................. 56-47149[U]

[51] Int. Cl.³ ............................................. G03B 29/00
[52] U.S. Cl. .................................................... 355/29
[58] Field of Search ................... 355/28, 29, 8, 11, 50, 355/51, 102, 97

[56] References Cited

U.S. PATENT DOCUMENTS

| 3,684,373 | 8/1972 | Berge et al. | 355/29 X |
| 4,013,357 | 3/1977 | Nakajima et al. | 355/29 X |
| 4,223,994 | 9/1980 | Stanton et al. | 355/28 |

Primary Examiner—Richard A. Wintercorn
Attorney, Agent, or Firm—Sughrue, Mion, Zinn, Macpeak & Seas

[57] ABSTRACT

An apparatus for printing a photographic printing paper is provided with a cutter for severing the paper web at the end of a printing cycle. The apparatus further includes a device for returning the leading edge of the unprinted paper back from the cutter, for example, to a position where it may be printed, to reduce the amount of wasted paper.

6 Claims, 3 Drawing Figures

PHOTOGRAPHIC PRINTING APPARATUS

BACKGROUND OF THE INVENTION

This invention relates to a photographic printing apparatus adapted to progressively print a strip of photographic printing paper, and cut a preceding printed portion of the strip from the following unprinted portion thereof.

When a strip of photographic printing paper is progressively printed, and fed directly to a developing apparatus, the printing cycle may sometimes end before a full roll of paper is consumed. In such a case, the printed portion is cut from the unprinted portion, so that only the printed portion is fed to the developing apparatus. Another printing cycle may start with the unprinted portion remaining in the printing station after being cut from the printed portion. The leading edge of the unprinted portion, however, is spaced from the printing station considerably, sometimes by a distance equal to several image frames, resulting in a waste of printing paper.

SUMMARY OF THE INVENTION

It is an object of this invention to provide a photographic printing apparatus which can eliminate any such waste of printing paper. In a photographic printing apparatus which includes a cutter for cutting a printed portion of a strip of photographic paper from an unprinted portion thereof, and a device for feeding the strip from a printing station to the cutter, this invention provides an improvement which includes means for returning the leading edge of the unprinted portion toward the printing station to an extent such that the unprinted portion may be again fed by the feeding means.

BRIEF DESCRIPTION OF THE DRAWINGS

The invention will now be described by way of example with reference to the drawings, in which.

DETAILED DESCRIPTION OF THE PREFERRED EMBODIMENTS

Figure 1:
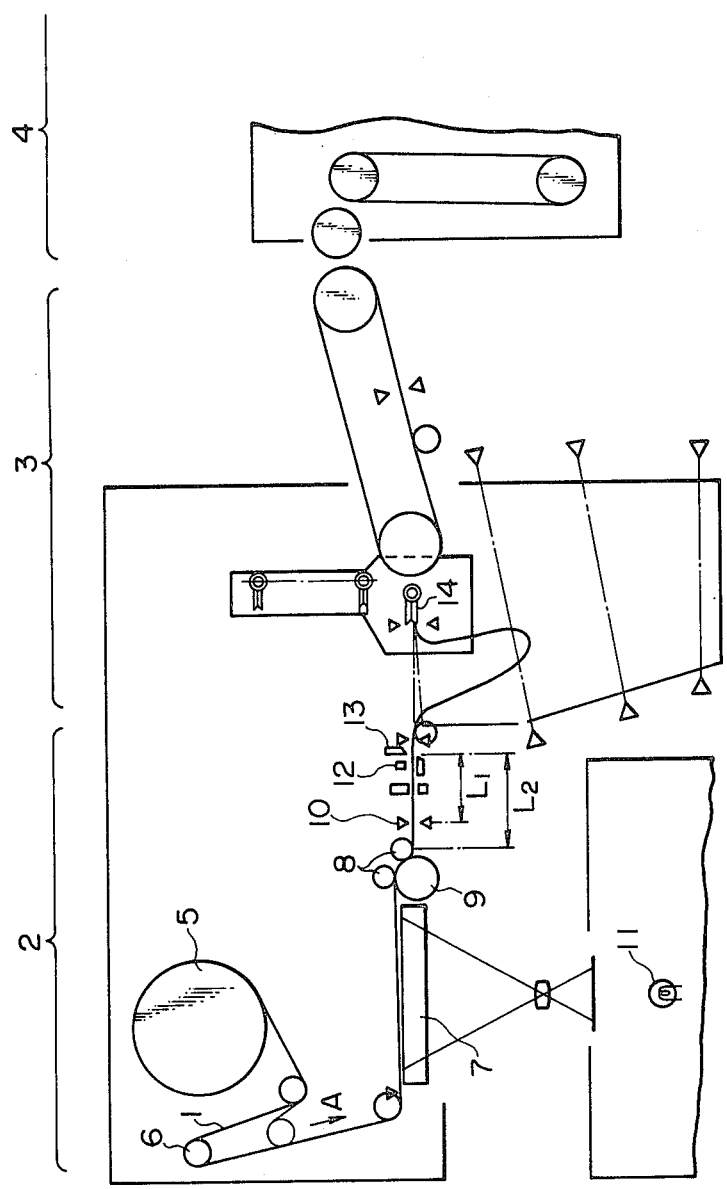
FIG. 1 is a diagrammatical view of a photographic printing apparatus embodying this invention.

A strip of photographic printing paper 1 is conveyed in a light-free enclosure through a printing station 2, a guide station 3 and a developing station 4. The strip 1 is unwound from a spool 5, passed about a tension roller 6 and over a printing table 7, and is received between a double press roller 8 and a feed roller 9. A sensor 10 is provided downstream of the press roller 8 for detecting the leading edge of the strip 1. At this time, the strip 1 is ready for the printing operation. The sensor 10 may, for example, by a photoelectric detecting slit having a width of about 0.6 to 0.1 mm in the strip conveyance path. A source of light 11 is provided in alignment with the printing table 7.

A hole puncher 12 and a cutter 13 are provided downstream of the sensor 10 at a certain distance $L_1$ therefrom. The hole puncher 12 is provided for forming the leading edge of the strip 1 with perforations with which a photographic printing paper guide clip 14 is engaged for conveying the printing paper. The cutter 13 is provided for cutting the leading edge of the strip 1 at a predetermined distance from the perforations.

Figure 2:
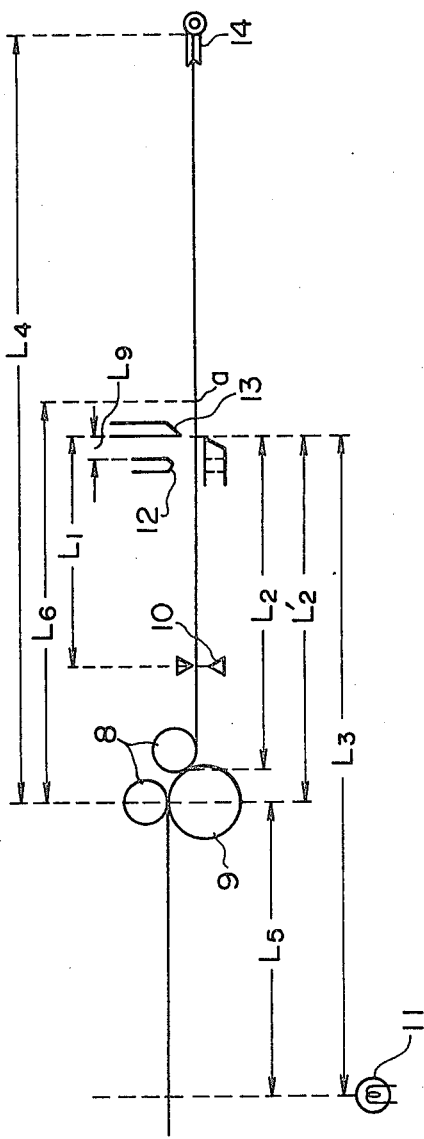
FIG. 2 is a diagrammatical view illustrating distance relationships among various parts of the printing station in the apparatus of this invention.

FIG. 2 is a diagrammatical view showing the distance relationships among the various parts of the printing and cutting station 2. In FIG. 2, the distance between the sensor 10 and the cutting edge of the cutter 13 is designated at $L_1$, the distance between the cutter 13 and the line of contact between the downstream press roller 8 and the feed roller 9 at $L_2$, the distance between the cutter 13 and the line of contact between the upstream press roller 8 and the feed roller 9 at $L_2'$, the distance between the optical axis of the light source 11 and the cutter 13 at $L_3$, the distance between the axis of the feed roller 9 and the printing paper guide clip 14 at $L_4$, the distance between the axis of the light source 11 and the axis of the feed roller 9 at $L_5$, the distance between the axis of the feed roller 9 and the stop position of the leading edge of the strip 1 at $L_6$, and the distance between the downstream side of the hole puncher 12 and the cutter 13 at $L_7$.

According to this invention, a means for returning photographic paper is provided for enabling printing of a part of the strip 1 lying in the area defined by the distance $L_2$ or $L_2'$ between the feed roller 9 and the cutter 13. The returning means may comprise a mechanism connected directly to the feed roller 9 for rotating it in the opposite direction to return the cut edge of the strip 1 to the press roller 8. The sag of the strip 1 which occurs when it is moved back is absorbed by the movement of the tension roller 6. The returning means may also comprise a mechanism for imparting reverse rotation to the spool 5, which may be either provided on the spool 5 per se, or connected directly to the spool 5, for moving the paper back the distance $L_2$ or $L_2'$. The latter mechanism is useful in the event that the sag of the paper is not fully absorbed by the tension roller 6. A combination of the former and latter mechanisms may also be useful. The returning means is very advantageous, since it prevents waste of the strip 1, and ensures economical printing.

The cutter 13 is employed when the spool 5 still carries unprinted paper 1 upon completion of a cycle of the printing operation. It cuts the printed portion from the unprinted portion, so that only the printed portion may be conveyed down to the developing station 4. The leading part of the unprinted portion lying in the area between the press rollers 8 and the cutter 13 is returned by the returning means toward the printing station. The backward movement of the strip 1 is stopped when its leading edge has reached a position between one of the press rollers 8 and the feed roller 9. Thus, the leading part of the unprinted portion of the strip 1 can be partly utilized for printing purposes without being wasted.

The operation of the apparatus as hereinabove explained by way of example will now be described.

The srip 1 is unwound from the spool 5, and passed about the tension roller 6 and over the printing table 7 in the direction of an arrow A, and its leading edge is received between the double press roller 8 and the feed roller 9. If the leading edge of the strip 1 has been detected by the sensor 10, it is returned upstream; if not, the strip 1 is moved forward, so that the leading edge of the paper 1 may stay at a prescribed position. The sag which the strip 1 may form between its leading edge and the spool 5 when it has been moved back is absorbed by the displacement of the tension roller 6.

After the leading edge of the strip 1 has been detected by the sensor 10, it is conveyed to, and stopped at the position a at the downstream end of the area $L_6$. The hole puncher 12 is actuated to form in the strip 1 a pair of perforations with which the printing paper guide clip 14 is engageable, and the cutter 13 cuts the leading edge of the strip 1 at the predetermined distance $L_7$ from the perforations at right angles to the longitudinal edges of the strip 1. The position a is spaced from the cutter 13 by an appropriate distance, which may usually be 2 to 5 mm, so that the leading edge of the strip 1 may be cut in a straight line at right angles to the longitudinal edges thereof. It is likely that the leading edge of the strip 1 may not be perpendicular to the longitudinal edges thereof before it is cut.

The strip 1 cut by the cutter 13 is moved back toward the printing table by the returning means, which may comprise the feed roller 9, and the tension roller 6 or the spool 5, until its leading edge reaches the position between the feed roller 9 and one of the press rollers 8. Accordingly, that part of the photographic paper lying between the press rollers 8 and the cutter 13 is moved back toward the printing table without being wasted.

When the spool 5 still carries unprinted photographic paper 1 thereon upon the completion of a printing cycle, the invention ensures that the unprinted paper 1 lying between the press rollers 8 and the cutter 13 after the printed portion has been cut off therefrom is moved back toward the printing station by the returning means. Therefore, the apparatus enables economical use of a part of the unprinted portion of the strip for another printing cycle.

According to the invention, it is further possible to eliminate the waste of photographic paper 1 by shortening the length of paper existing between the printed portion of strip 1 and the unprinted portion thereof to be printed during another printing cycle when the spool 5 still carries unprinted photographic paper 1 thereon. Although the portion of strip 1 lying between the feed roller 9 and the cutter 13 is moved back to the upstream side of the feed roller 9 by the returning means, the photographic paper 1 lying in the vicinity of the feed roller 9 cannot be printed. It is, however, possible to eliminate a photograhic paper portion which cannot be printed, if the portion printed during one printing cycle is cut off from the strip 1 after another printing cycle is finished. These features will be described in further detail with reference to FIG. 3.

Figure 3:
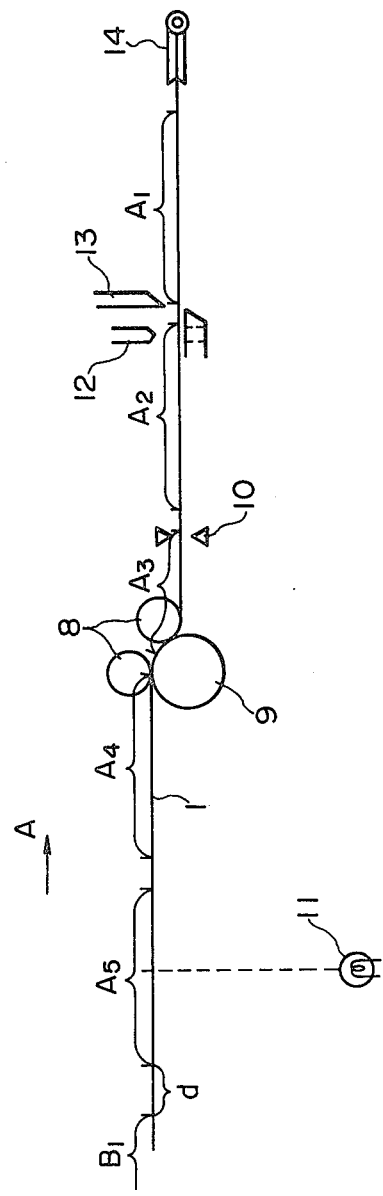
FIG. 3 is a diagrammatical view showing the feeding, printing and cutting of a strip of photographic paper.

FIG. 3 is a diagrammatical view showing the feed of the strip 1, in relation to the printing and cutting thereof. A first printing cycle operation ends with a frame $A_5$ on strip 1. According to the invention, the printed portion ending with frame $A_5$ is not cut from strip 1 at the area d where the photographic paper guide clip 14 is engaged with strip 1, but a second printing cycle is started. As the second printing cycle proceeds and strip 1 moves forward in the direction of the arrow A, the leading edge of the area d reaches the cutter 13, whereupon the hole puncher 12 and the cutter 13 are actuated to cut the strip 1. While the previously printed portions $A_1$–$A_5$ cut from the strip 1 are conveyed through the guide station 3 and the developing station 4, the leading edge of the remaining strip 1 is in a standby position for engagement by the photographic paper guide clip 14, while the second printing cycle is going on for frames $B_1$, $B_2$, . . . . If the length of the photographic paper 1 to be printed during the second printing cycle is greater than $L_5+L_4-L_3$, its leading edge is engaged with the photographic paper guide clip 14, and after the photographic paper 1 has been fed forward a predetermined distance, it is stopped.

According to the photographic printing apparatus of this invention, the unprinted portion of the photographic paper cut from the printed portion thereof, and lying between the feed roller 9 and the cutter 13 is moved back toward the printing station by the returning means, as hereinabove described. Therefore, at least a part of any such unprinted portion can be printed during another cycle of the printing operation, and the photographic paper 1 can be utilized economically without being wasted.

What is claimed is:

1. A photographic printing apparatus comprising printing means, means for supplying a strip of photographic paper to said printing means, a cutter for cutting a printed portion of said strip of photographic printing paper from the the remaining unprinted portion thereof, feeding means for feeding said strip from said printing means to said cutter, and return means for returning the leading edge of said unprinted portion to said feeding means whereby upon return of the unprinted portion adjacent said leading edge to said printing means printing may take place on said unprinted portion so that substantially all of said paper strip may be printed without waste.

2. A photographic printing apparatus as set forth in claim 1, wherein said returning means comprises means connected to said feeding means.

3. A photographic printing apparatus as set forth in claim 2, wherein said feeding means includes a feed roller, said returning means being connected to said feed roller and being operable to reversely rotate said feed roller.

4. A photographic printing apparatus as set forth in claim 2, said feeding means including a spool for said photographic paper, said returning means comprising means for reversely rotating said spool.

5. A photographic printing apparatus as set forth in claim 2, said feeding means comprising a feed roller and a spool for said photographic paper, said returning means comprising means for reversely rotating said feed roller and said spool.

6. A photographic printing apparatus as set forth in claim 2, 3, 4 or 5, further comprising tension roller means for absorbing slack in said photographic paper strip upon the returning of said unprinted portion.

* * * * *